(12) United States Patent
Bin et al.

(10) Patent No.: US 12,090,875 B2
(45) Date of Patent: Sep. 17, 2024

(54) MULTI-INPUT CHARGING SYSTEM AND METHOD USING A MOTOR DRIVING DEVICE

(71) Applicants: HYUNDAI MOTOR COMPANY, Seoul (KR); KIA CORPORATION, Seoul (KR)

(72) Inventors: Seung Hyeon Bin, Busan (KR); Ho Rim Choi, Changwon-si (KR); Tae Il Yoo, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 475 days.

(21) Appl. No.: 17/379,749

(22) Filed: Jul. 19, 2021

(65) Prior Publication Data

US 2022/0144114 A1    May 12, 2022

(30) Foreign Application Priority Data

Nov. 9, 2020   (KR) .................. 10-2020-0148481

(51) Int. Cl.
| | | |
|---|---|---|
| *H02J 7/04* | (2006.01) | |
| *B60L 3/00* | (2019.01) | |
| *B60L 50/51* | (2019.01) | |
| *B60L 53/22* | (2019.01) | |
| *B60L 53/24* | (2019.01) | |
| *B60L 58/13* | (2019.01) | |
| *H02J 7/16* | (2006.01) | |

(52) U.S. Cl.
CPC ............... *B60L 53/24* (2019.02); *B60L 3/003* (2013.01); *B60L 3/0061* (2013.01); *B60L 50/51* (2019.02); *B60L 53/22* (2019.02); *B60L 58/13* (2019.02); *H02J 7/04* (2013.01); *H02J 7/16* (2013.01); *B60L 2210/42* (2013.01); *H02J 2207/20* (2020.01)

(58) Field of Classification Search
CPC ................ H02J 7/04; H02J 7/16; B60L 58/13
See application file for complete search history.

(56) References Cited

U.S. PATENT DOCUMENTS

2012/0112702 A1*   5/2012   Steigerwald ............ B60L 50/40
320/137

FOREIGN PATENT DOCUMENTS

| KR | 1020190119778 | 4/2018 |
| KR | 1020200068175 | 12/2018 |
| KR | 1020200075937 | 12/2018 |

\* cited by examiner

*Primary Examiner* — Robert Grant
(74) *Attorney, Agent, or Firm* — Lempia Summerfield Katz LLC (57) ABSTRACT

A multi-input charging system and method use a motor driving device. The system includes: a motor having a plurality of windings; a first inverter including first switching elements and having one end connected to a power input terminal and an opposite end connected to a first terminal of each of the plurality of windings; a second inverter including second switching elements and having one end connected to a battery and an opposite end connected to a second terminal of each of the plurality of windings, the battery connected to the power input terminal or the one end of the second inverter; and a controller configured to charge the battery directly via the power input terminal or with a voltage of the charging power that is stepped down.

14 Claims, 8 Drawing Sheets

MULTI-INPUT CHARGING SYSTEM AND METHOD USING A MOTOR DRIVING DEVICE

CROSS REFERENCE TO RELATED APPLICATION

The present application claims priority to Korean Patent Application No. 10-2020-0148481, filed Nov. 9, 2020, the entire contents of which are incorporated herein for all purposes by this reference.

BACKGROUND

Field of the Disclosure

The present disclosure relates to a multi-input charging system and a method using a motor driving device and, more particularly, to a system and a method for charging a battery using external charging power.

Description of the Related Art

In general, electric vehicles or plug-in hybrid vehicles perform battery charging by converting power provided from an external charging facility into a state suitable for charging a battery in a vehicle and for providing the converted power to the battery.

Conventionally, charging facilities for quick charging have been manufactured to output a single voltage standard of 500 V, but batteries used in vehicles tend to be designed to have a voltage of 800 V or more to improve efficiency and driving distance.

Accordingly, some of the quick charging facilities have a voltage standard of 1000 V, and the 1000 V quick charging facilities may be stepped down to a voltage suitable for a battery. Thus, an 800 V battery may be charged. However, in order to charge an 800 V battery using a charging facility having a voltage standard of 500 V, a boost converter for boosting a voltage provided from an external charging facility is required.

However, a high-capacity boost converter for boosting a voltage of 500 V to at least 800 V has a very large weight and volume and is expensive, and thus it is difficult to provide in a vehicle and may increase the price of the vehicle.

Vehicles use a motor's coil and an inverter's power conversion switch as a boost converter for boosting. In order to control the voltage of the output terminals of the quick charger, the output voltages of the battery and the quick charger are monitored, the duty is calculated, and then the three-phase top and bottom switches of the inverter are switched at a ratio corresponding to the duty.

However, according to conventional art, in the case of charging a 400 V battery with a 1000 V quick charging facility, the battery is charged with a voltage that is stepped down, so the quick charger voltage specification may not be sufficiently utilized. Accordingly, the charging speed becomes the same as that for a 500 V quick charging facility. Accordingly, there is a problem in that the charging speed is slow even when the 1000 V quick charging facility is used.

The subject matter described as the related art are only to enhance understanding of the background of the present disclosure and should not be taken as acknowledging that the subject matter corresponds to the related art already known to those having ordinary skill in the art.

SUMMARY

Accordingly, the present disclosure has been made keeping in mind the above problems occurring in the related art. The present disclosure is intended to provide a technology for charging a battery by directly charging the battery with charging power or with a voltage of the charging power that is stepped down using a motor and inverters, according to a voltage level of external charging power.

In order to achieve the above objective, there may be provided a multi-input charging system using a motor driving device according to the present disclosure. The system may include a motor having a plurality of windings corresponding to a plurality of phases, respectively. The system may further include a first inverter including a plurality of first switching elements and having one end connected to a power input terminal to which charging power is input from the outside and an opposite end connected to a first terminal of each of the plurality of windings. The system may further include a second inverter including a plurality of second switching elements and having one end connected to a battery and an opposite end connected to a second terminal of each of the plurality of windings. The system may further include the battery connected to the power input terminal or the one end of the second inverter. The system may further include a controller configured to directly charge the battery via the power input terminal or to charge the battery with a voltage of the charging power that is stepped down through the first inverter and the second inverter, depending on a voltage level of the charging power input to the power input terminal when a charging mode for charging the battery is initiated.

The system may further include a charging relay provided between the power input terminal and the battery. The controller may be configured to control the charging relay whether to be short-circuited, thereby charging the battery via the power input terminal, directly or with the voltage of the charging power that is stepped down through the first inverter and the second inverter.

When the charging mode is initiated, the controller may be configured to charge the battery through the first inverter and the second inverter when the voltage level of the charging power is no less than a reference voltage preset to a chargeable level.

The controller may be configured to control pulse width modulation so that the plurality of first switching elements included in the first inverter is to be turned on/off according to a duty ratio.

The controller may be configured to set the duty ratio of top switching elements among the plurality of first switching elements as a ratio of a voltage of the battery to the voltage level of the charging power.

The controller may be configured to control top switching elements of the plurality of second switching elements included in the second inverter to be always turned on.

The controller may be configured to diagnose whether the motor, the first inverter, or the second inverter has a failure. When the failure is diagnosed, the controller may be configured to directly charge the battery via the power input terminal.

The system may further include a current sensor configured to sense a phase current flowing in each of the plurality of phases of the motor by being provided in each of the plurality of windings of the motor. The controller may be configured to diagnose whether the motor, the first inverter, or the second inverter has a failure on the basis of each phase current sensed by the current sensor and an input current of the battery.

The system may further include a temperature sensor configured to sense a temperature by being provided in each of the plurality of first switching elements or in each of the plurality of second switching elements. The controller may be configured to diagnose whether the motor, the first inverter, or the second inverter has a failure on the basis of the temperature sensed by each of the temperature sensors.

In order to achieve the above objective, there may be provided a multi-input charging method using a motor driving device according to the present disclosure. Using the motor driving device, the method may include receiving a voltage level of charging power input to the power input terminal. The method may further include determining whether to charge a battery directly or with the voltage of the charging power that is stepped down, depending on the received voltage level of the charging power. The method may further include directly charging the battery via the power input terminal or charging the battery with the voltage of the charging power that is stepped down through the first inverter and the second inverter, on the basis of the determined result.

In the charging the battery, a charging relay provided between the power input terminal and the battery may be controlled whether to be short-circuited, thereby charging the battery via the power input terminal, directly or with the voltage of the charging power that is stepped down through the first inverter and the second inverter.

In the charging the battery, pulse width modulation may be controlled so that the plurality of first switching elements included in the first inverter may be to be turned on/off according to a duty ratio. Top switching elements of the plurality of second switching elements included in the second inverter may be controlled to be always turned on.

The method may further include, after the charging the battery, diagnosing whether the motor, the first inverter, or the second inverter has a failure and directly charging the battery via the power input terminal when the failure is diagnosed.

In the diagnosing whether the failure has occurred, phase currents flowing in the plurality of phases of the motor may be sensed by current sensors provided in the plurality of windings of the motor. On the basis of the sensed phase currents and an input current of the battery, it may be diagnosed whether the motor, the first inverter, or the second inverter has a failure. Alternatively, a temperature may be sensed by temperature sensors provided in the plurality of first switching elements or the plurality of second switching elements. On the basis of the sensed temperature, it may be diagnosed whether the motor, the first inverter, or the second inverter has a failure.

As described above, according to the multi-input charging system and method using the motor driving device of the present disclosure, when high voltage external charging power is used, there is an effect of improving a charging speed of a battery through voltage step-down control using a motor and dual inverters.

In addition, there is an effect of enabling stable charging of the battery using charging power of various voltages by diagnosing whether the motor, a first inverter, or a second inverter has a failure during charging of the battery.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Specific structural or functional descriptions of embodiments of the present disclosure disclosed in the present specification or application are exemplified only for a purpose of describing the embodiments according to the present disclosure. Accordingly, the embodiments according to the present disclosure may be implemented in various forms and should not be construed as being limited to the embodiments described in the present specification or application.

Since the embodiments according to the present disclosure may be changed in various ways and have various forms, specific embodiments are illustrated in the drawings and are described in detail in the present specification or application. However, this is not intended to limit the embodiments according to the concept of the present disclosure to a specific form of the disclosed embodiments but should be understood to include all changes, equivalents, or substitutes included in the spirit and scope of the present disclosure.

Terms such as first and/or second may be used to describe various elements, but the elements should not be limited by the terms. The terms are only for the purpose of distinguishing one component from other components. For example, without departing from the scope of the rights according to the concept of the present disclosure, the first component may be named as the second component, and similarly, the second component may also be referred to as a first component.

When a component is referred to as being "coupled" or "connected" to another component, it should be understood that the component may be directly coupled or connected to another component, but other components may exist therebetween. On the other hand, when a component is referred to as being "directly coupled" or "directly connected" to another component, it should be understood that there is no other component therebetween. Other expressions describing the relationship between components, such as "between" and "just between" or "adjacent to" and "directly adjacent to" should be interpreted in the same way as well.

The terms used in the present specification are only used to describe specific embodiments and are not intended to limit the present disclosure. Singular expressions include plural expressions unless the context clearly indicates otherwise. In the present specification, terms such as "comprise" or "have" are intended to designate the presence of a set feature, number, step, action, component, part, or combination thereof and should be understood not to preclude in advance the presence or addition of at least one other feature or number, step, action, component, part, or a combination thereof.

Unless otherwise defined, all terms used herein, including technical or scientific terms, have the same meaning as commonly understood by a person of ordinary skill in the art to which the present disclosure pertains. Terms such as those defined in commonly used dictionaries should be interpreted as having meanings consistent with the meanings of the related technology and should not be interpreted as ideal or excessively formal meanings unless explicitly defined in the present specification.

Hereinafter, the present disclosure is described in detail by describing an embodiment of the present disclosure with reference to the accompanying drawings. The same reference numerals in each drawing refer to the same or equivalent members.

Figure 1:
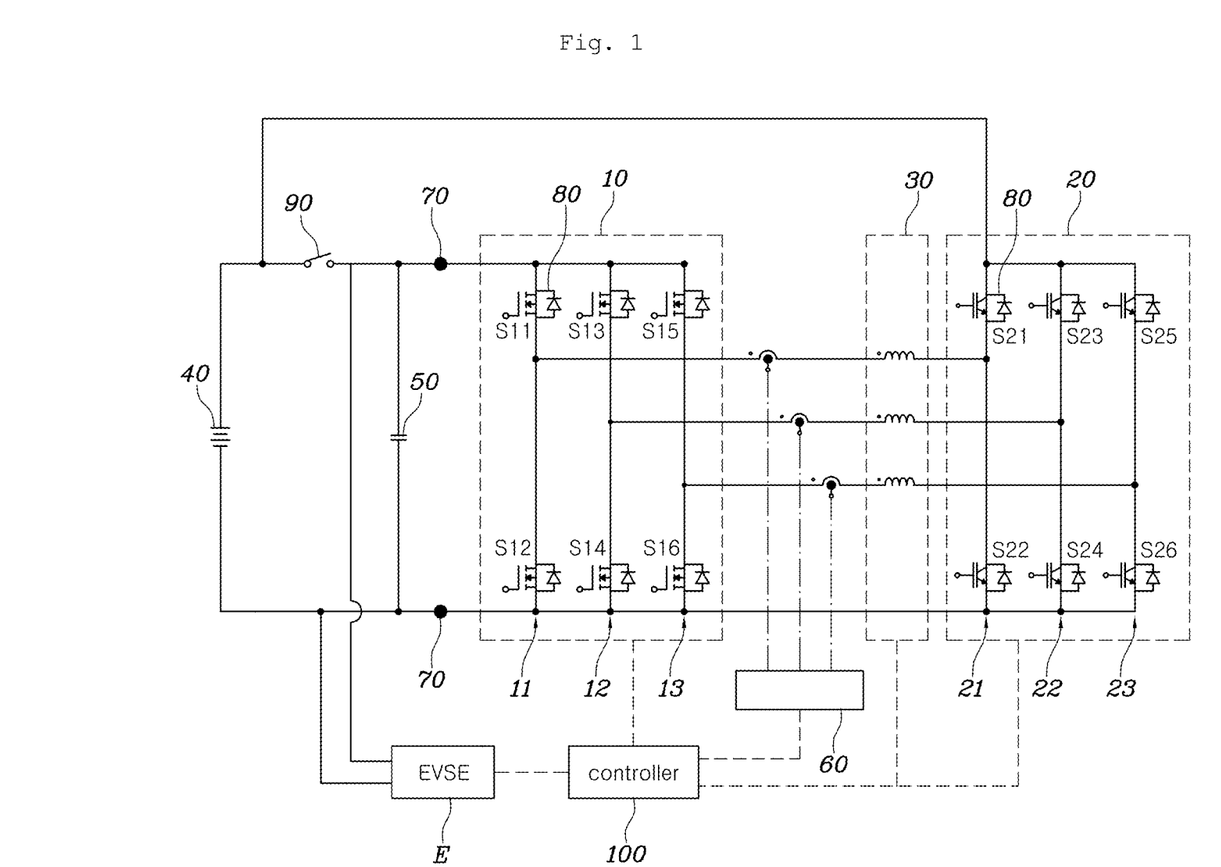
FIG. 1 is a circuit diagram of a multi-input charging system using a motor driving device according to an embodiment of the present disclosure.
Figure 2:
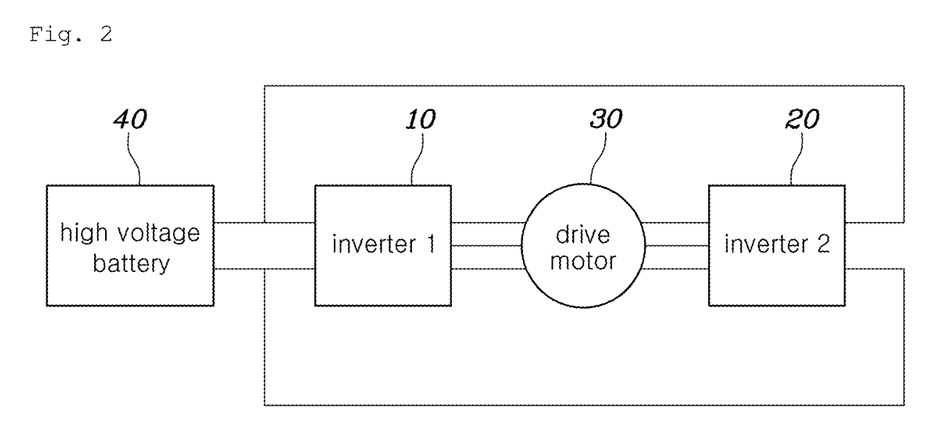
FIG. 2 is a schematic diagram of the multi-input charging system using the motor driving device according to the embodiment of the present disclosure.

FIG. 1 is a circuit diagram of a multi-input charging system using a motor 30 driving device according to an embodiment of the present disclosure. FIG. 2 is a schematic diagram of the multi-input charging system using the motor 30 driving device according to the embodiment of the present disclosure.

With reference to FIGS. 1 and 2, the multi-input charging system using the motor 30 driving device according to the embodiment of the present disclosure includes a motor 30 having a plurality of windings corresponding to a plurality of phases, respectively. The system further includes a first inverter 10 including a plurality of first switching elements and having one end connected to a power input terminal to which charging power is input from the outside and an opposite end connected to a first terminal of each of the plurality of windings. The system further includes a second inverter 20 including a plurality of second switching elements and having one end connected to a battery and an opposite end connected to a second terminal of each of the plurality of windings. The system further includes the battery 40 connected to the power input terminal or the one end of the second inverter. The system further includes a controller 100 configured to directly charge the battery 40 via the power input terminal or to charge the battery 40 with the voltage of the charging power that is stepped down through the first inverter 10 and the second inverter 20. The charging depends on a voltage level of the charging power input to the power input terminal, when a charging mode for charging the battery 40 is initiated.

The controller 100 according to an embodiment of the present disclosure may be implemented through: a nonvolatile memory (not shown) configured to store an algorithm configured to control the operation of various components of a vehicle or data related to a software command for reproducing the algorithm; and a processor (not shown) configured to perform an operation described below using data stored in the corresponding memory. Here, the memory and the processor may be implemented as separate chips. Alternatively, the memory and processor may be integrated with each other and implemented as a single chip. Meanwhile, the processor may take the form of at least one processor.

In general, the winding of each phase included in the motor 30 has one end connected to one inverter and an opposite end connected to an opposite end of each of the windings of other phases to form a Y-connection.

When the motor 30 is driven, the switching elements in the inverter are turned on/off by pulse width modulation control and allow a line voltage to be applied to the winding of the Y-connected motor 30 to produce an AC current. Thus, torque may be generated. The AC output limit voltage of the inverter is proportional to a DC voltage level of the high voltage battery 40.

The fuel economy (or electric power consumption) of eco-friendly vehicles such as electric vehicles and the like using the torque generated by the motor 30 as power is determined by the power conversion efficiency of the inverter and motor 30. Thus, it is important to maximize the power conversion efficiency of the inverter and the efficiency of the motor 30 in order to enhance the fuel economy.

In the present disclosure, as shown in FIG. 2, in order to increase the zero-back performance of an electric vehicle by increasing the output of the motor 30 having the same reference voltage, a structure of an open-end winding motor and dual inverters, which share the same battery 40 as follows, is used.

When switching by using the dual inverter, the phase voltage of the motor 30 may be available up to more than twice with the existing SVPWM as a reference.

In a region above a base rpm where torque is limited, the available current of the dual inverters is greater than that of a single inverter, so that greater output may be produced. In the case of the dual inverter, a neutral terminal of the Y connection of the motor 30 is connected to the three-phase input terminals of the inverter 2, respectively, and the motor 30 is referred to as an open-end winding motor 30.

A quick charging method of the battery 40 is a method of converting AC power input from the outside into DC power through the quick charger E and of directly charging the battery 40 with high power by controlling the current. Currently, infrastructures of 50 kW, 100 kW, 200 kW, and 400 kW exist domestically and abroad. In an embodiment, the power input terminal of the infrastructures may have an output voltage of 500 V or 1000 V.

A method in which the infrastructure having the output voltages of the power input terminal as 500 V and 1000 V is capable of quickly charging at both voltage levels is referred to as a multi-input charging method.

Specifically, a vehicle uses the coil of the motor 30 and the power conversion switch of the inverter as a boost converter or a buck converter for boosting. In an embodiment, in order to control the voltage of the power input terminal, after calculating the duty by monitoring the output voltage of the battery 40 and the quick charger E, top and bottom switches of the 3-phase inverter may be to be switching at a ratio corresponding to the duty.

With reference back to FIG. 1, the first inverter 10 and the second inverter 20 may convert: DC power stored in the battery 40 into three-phase AC power and provide the AC power to the motor 30; or regenerative braking energy, generated by the generation of the regenerative braking torque of the motor 30 during regenerative braking, into DC power and provide the DC power to the battery 40. Conversion between such DC power and AC power may be performed by control of the pulse width modulation of a plurality of first switching elements (S11 to S16) and a plurality of second switching elements (S21 to S26) provided in the first inverter 10 and the second inverter 20, respectively.

The first inverter 10 may include a plurality of legs 11 to 13 to which a DC voltage formed in a DC link capacitor connected to opposite ends of the battery 40 is applied. Each of the legs 11 to 13 may correspond to each of the plurality of phases of the motor 30 to form an electrical connection.

More specifically, the first leg 11 includes two switching elements S11 and S12 connected in series with each other between opposite ends of the DC capacitor 50. A connection node of the two switching elements S11 and S12 may be connected to one end of a winding C1, which is one phase of the motor 30, in order to allow AC power corresponding to one of the plurality of phases to be input/output.

Similarly, the second leg 12 includes two switching elements S13 and S14 connected in series with each other between the opposite ends of the DC capacitor 50. A connection node of the two switching elements S13 and S14 may be connected to one end of a winding C2, which is one phase of the motor 30, in order to allow AC power corresponding to one of the plurality of phases to be input/output.

In addition, the third leg 13 includes two switching elements S15 and S16 connected in series with each other between the opposite ends of the DC capacitor 50. A connection node of the two switching elements S15 and S16 may be connected to one end of a winding C3, which is one phase of the motor 30, in order to allow AC power corresponding to one of the plurality of phases to be input/output.

The second inverter 20 may also have a similar configuration as the first inverter 10. The second inverter 20 may include a plurality of legs 21 to 23 to which a DC voltage formed in a DC link capacitor connected to the opposite ends of the battery 40 is applied. Each of the legs 21 to 23 may correspond to the plurality of phases of the motor 30 to form an electrical connection.

More specifically, the first leg 21 includes two switching elements S21 and S22 connected in series with each other between the opposite ends of the DC capacitor 50. A connection node of the two switching elements S21 and S22 may be connected to an opposite end of a winding C1, which is one phase of the motor 30, in order to allow AC power corresponding to one of the plurality of phases to be input/output.

Similarly, the second leg 22 includes two switching elements S23 and S24 connected in series with each other between the opposite ends of the DC capacitor 50. A connection node of the two switching elements S23 and S24 may be connected to an opposite end of a winding C2, which is one phase of the motor 30, in order to allow AC power corresponding to one of the plurality of phases to be input/output.

In addition, the third leg 23 includes two switching elements S25 and S26 connected in series with each other between the opposite ends of the DC capacitor 50. A connection node of the two switching elements S25 and S26 may be connected to an opposite end of a winding C3, which is one phase of the motor 30, in order to allow AC power corresponding to one of the plurality of phases to be input/output.

The first inverter 10 is connected to one end of each of the windings C1 to C3 of the motor 30 and the second inverter 20 is connected to the opposite end of each of the windings C1 to C3 of the motor 30. In other words, an open-end winding type electrical connection may be formed, wherein opposite ends of each of the windings C1 to C3 of the motor 30 are connected to the first inverter 10 and the second inverter 20, respectively.

The battery 40 may be connected to the power input terminal simultaneously with the DC capacitor 50, the first inverter 10 and the second inverter 20. When the battery 40 is directly connected to the power input terminal, the battery 40 may be directly charged by the power input terminal.

Alternatively, the battery 40 may be charged with the voltage of the charging power that is stepped down through the motor 30, first inverter 10, and the second inverter 20 when the connection with the power input terminal is cut off. Here, the motor 30, first inverter 10, and the second inverter 20 may be used as a step-down converter.

The controller 100 may control so that the battery 40 is directly charged via the power input terminal or is charged with the voltage of the charging power that is stepped down through the first inverter 10 and the second inverter 20.

More specifically, when the charging mode for charging the battery 40 is initiated, the controller 100 may determine whether to directly charge the battery 40, or to charge the battery 40 with the voltage of the charging power that is stepped down. The charging depends on a voltage level of the charging power input to the power input terminal when a charging mode for charging the battery is initiated.

As an embodiment, the charging system further includes a charging relay 90 provided between the power input terminal and the battery 40, wherein the controller 100 may control the charging relay 90 to be or not to be short-circuited. Thus, the battery 40 may be charged via the power input terminal, directly or with the voltage of the charging power that is stepped down through the first inverter 10 and the second inverter 20.

The charging relay 90 may be located between the power input terminal and the battery 40, allow the power input terminal to be connected to the battery 40 when short-circuited, and block the power between the power input terminal and the battery 40 when disconnected.

Specifically, the power input terminal may be connected to the battery 40 through the charging relay 90 and connected to the first inverter 10 at the same time. The power input terminal may be constantly connected to the first inverter 10.

When the charging mode is initiated, the controller 100 may charge the battery 40 through the first inverter 10 and the second inverter 20 when the voltage level of the charging power is no less than a reference voltage preset to a chargeable level.

As one embodiment, voltages of the charging power input to the power input terminal may be 500 V and 1000 V. On the other hand, the voltage of the battery 40 may be a 400 V class or an 800 V class.

Here, when the voltage of the battery 40 is 400 V, and the voltage of the charging power is 1000 V, the controller 100 may charge the battery 40 by stepping down the voltage of the charging power. As another embodiment, when the voltage of the charging power is 500 V, the battery 40 may be directly charged via the power input terminal.

For example, the preset reference voltage may be preset between 500 V and 1000 V. In other words, when the voltage level of the charging power is 1000 V, which is no less than the preset reference voltage, the controller 100 may charge the battery 40 at the voltage stepped down through the first inverter 10 and the second inverter 20.

FIGS. 3-6 are views showing control of the first switching elements according to the embodiment of the present disclosure.

With reference to FIGS. 3-6, the controller 100 may control pulse width modulation (PWM) so that the plurality of first switching elements included in the first inverter is to be turned on/off according to a duty ratio.

Here, among a plurality of first switching elements included in the first inverter 10, IGBT 1 may be top switching elements S11, S13, and S15, and IGBT 2 may be bottom switching elements S12, S14, and S16.

The controller 100 may alternately switch IGBT 1 and IGBT 2 included in the first inverter 10, thereby stepping down the charging voltage Vin of the power input terminal. Specifically, the controller 100 may switch IGBT 1 to be On and IGBT 2 to be Off, or IGBT 1 to be Off and IGBT 2 to be On.

Figure 3:
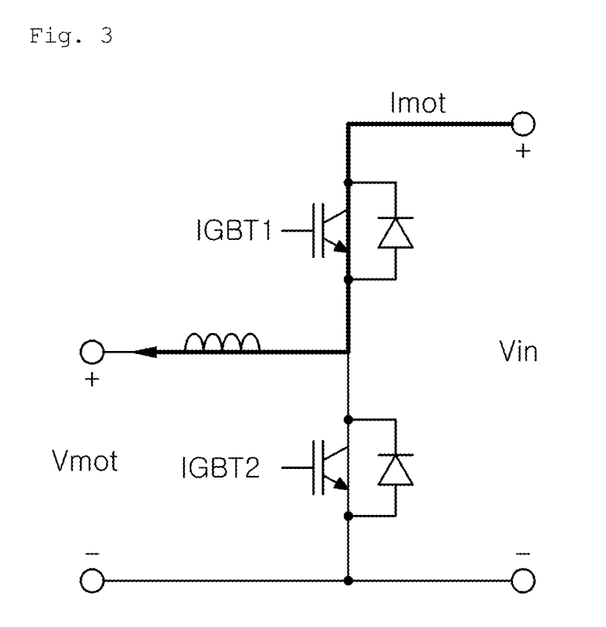
FIGS. 3-6 are views showing control of the first switching elements according to the embodiment of the present disclosure.

As shown in FIG. 3, when IGBT 1 is turned on and IGBT 2 is turned off, energy may be stored in an inductor located in the winding of the motor 30 by the charging voltage Vin of the power input terminal.

Figure 4:
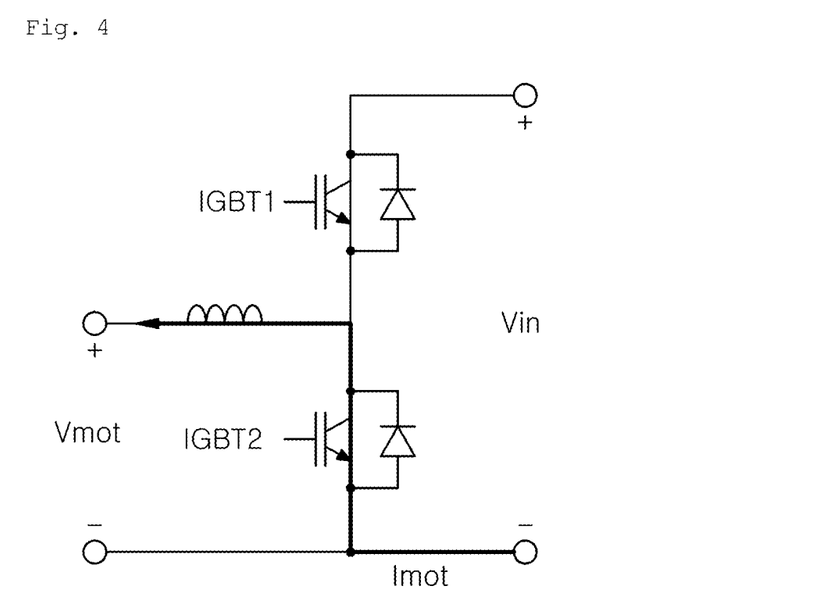

In addition, as shown in FIG. 4, when IGBT 1 is turned off and IGBT 2 is turned on, energy stored in the inductor may be discharged.

Figure 5:
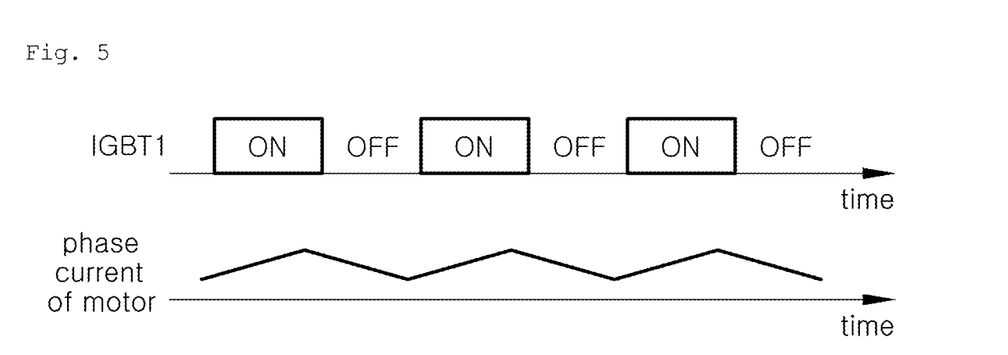
Figure 6:
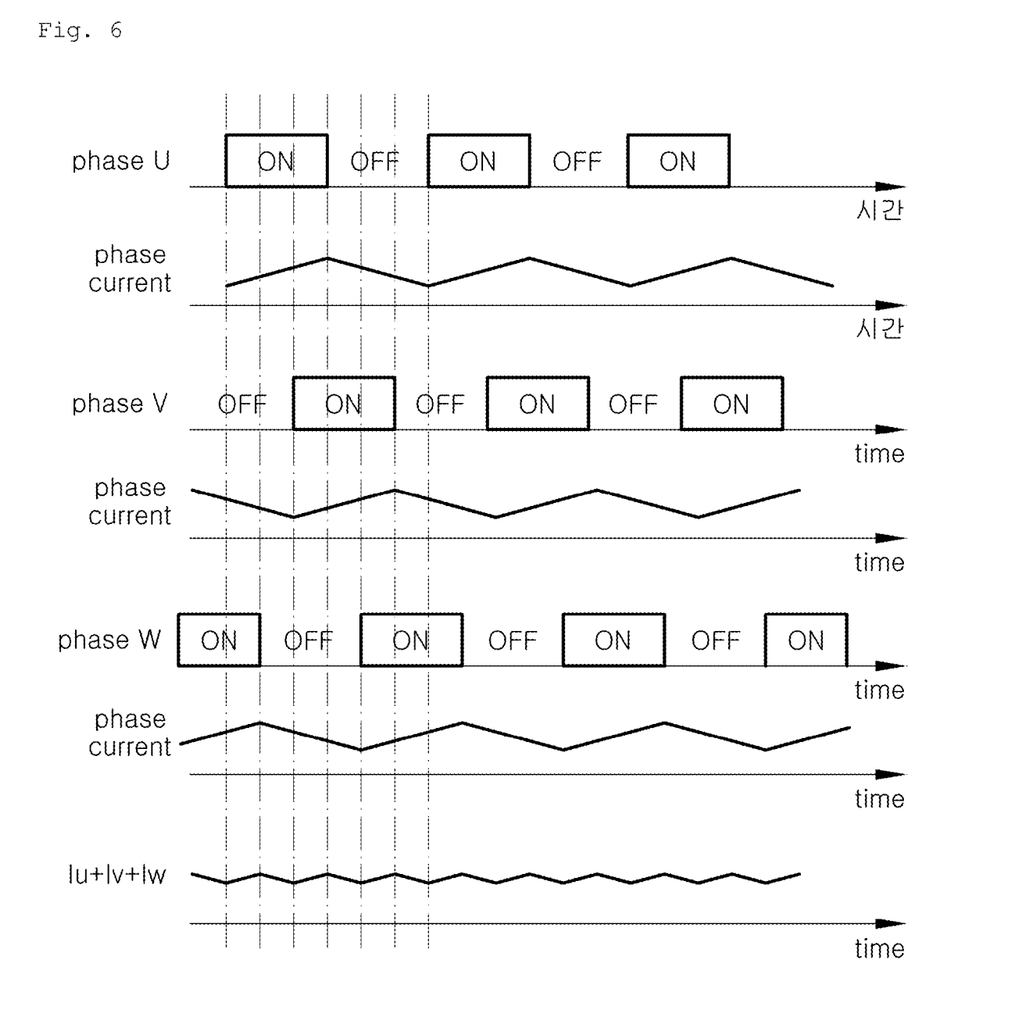

As shown in FIG. 5, the controller 100 may control IGBT 1, which is the top switching elements S11, S13, S15, among the plurality of first switching elements included in the first inverter 10, to be turned On/Off according to a duty ratio.

The phase currents (phase U, phase V, and phase W) of the motor 30 may be increased when IGBT 1 is On and decreased when IGBT 1 is Off.

More specifically, the controller 100 may set the duty ratio of the top switching elements among the plurality of first switching elements as a ratio of a voltage of the battery to the voltage level of the charging power.

In an embodiment, the controller 100 may set the duty ratio D turning on the IGBT 1, which is the top switching elements S11, S13, and S15 included in the plurality of first switching elements as the ratio of the voltage Vbat of the battery 40 to the voltage level Vin of the charging power. Here, the duty ratio D may be a ratio of On time to a switching period (On time+Off time).

$$D = V\text{bat}/V\text{in}$$

Additionally, as shown in FIG. 5, the controller 100 may perform a three-phase interleaving control of a plurality of first switching elements connected to the three phases of the motor 30, respectively.

Specifically, at intervals of ⅓ cycle of switching, the controller may perform the three-phase interleaving control of the top switching elements S11, S13, and S15 and the bottom switching elements S12, S14, and S16 at intervals of ⅓ cycle of switching, wherein each switching element is connected to corresponding one of the three phases (phase U, phase V, and phase W) of the motor 30. Accordingly, there is an effect in which a change in the sum of the phase currents for the three phases of the motor 30 is minimized, and a ripple of the current of the battery 40 is minimized.

Figure 7:
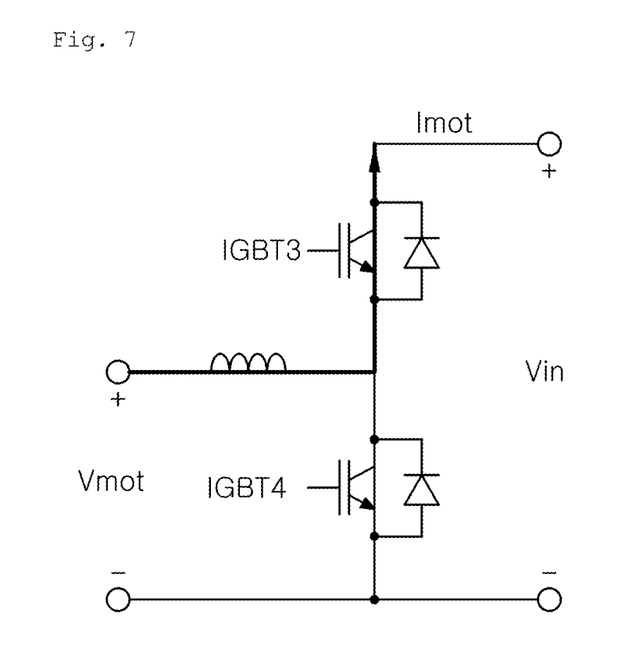
FIG. 7 is a circuit diagram showing control of second switching elements according to the embodiment of the present disclosure.

FIG. 7 is a circuit diagram showing control of second switching elements according to the embodiment of the present disclosure.

With further reference to FIG. 7, the controller 100 may control the top switching elements of the plurality of second switching elements included in the second inverter 20 to be always turned on.

Here, among a plurality of second switching elements included in the second inverter 20, IGBT 3 may be top switching elements S21, S23, and S25 and IGBT 4 may be bottom switching elements S22, S24, and S26.

The controller 100 may control the top switching elements S21, S23, and S25 among the plurality of second switching elements included in the second inverter 20 to be always turned on, and accordingly, the inductor energy of the motor 30 may be transferred to the battery 40.

In this case, the controller 100 may control the bottom switching elements S22, S24, and S26 of the plurality of second switching elements to be always turned off.

The controller 100 may diagnose whether the motor 30, the first inverter 10, or the second inverter 20 has a failure, and when the failure is diagnosed, may directly charge the battery 40 via the power input terminal.

Specifically, the controller 100 diagnoses whether the motor 30, the first inverter 10, or the second inverter 20 has a failure, and when the failure does not occur, may allow the battery 40 to be charged by the charging voltage of the charging power that is stepped down through the motor 30, the first inverter 10, or the second inverter 20.

Conversely, when a failure of the motor 30, the first inverter 10, or the second inverter 20 is diagnosed, the controller 100 may allow the battery 40 to be directly charged via the power input terminal.

Accordingly, the controller 100 may continuously diagnose the state of the motor 30, the first inverter 10, or the second inverter 20 and stably charge the battery 40 at the same time.

As one embodiment, the charging system may further include a current sensor 60 configured to sense a phase current flowing in each of the plurality of phases of the motor 30 by being provided in each of the plurality of windings of the motor 30. The controller 100 may diagnose whether the motor 30, the first inverter 10, or the second inverter 20 has a failure on the basis of each phase current sensed by current sensor 60 and the input current of the battery 40.

The current sensor 60 is positioned on each of the plurality of windings corresponding to the three phases (phase U, phase V, and phase W) of the motor 30, and may sense a phase current flowing through each of the plurality of phases. The controller 100 may determine whether the sum of the phase currents (Iu+Iv+Iw) flowing in the plurality of phases sensed by the current sensors 60 is equal to the input current Ibat of the battery 40, and accordingly, diagnose a failure of the sensor 60.

Additionally, a voltage sensor 70 configured to sense the voltage of the battery 40 may be further provided.

As another embodiment, the charging system may further include a temperature sensor 80 configured to sense a temperature by being provided in each of the plurality of first switching elements or in each of the plurality of second switching elements. The controller 100 may diagnose whether the motor 30, the first inverter 10, or the second inverter 20 has a failure on the basis of the temperature sensed by each of the temperature sensors 80.

The temperature sensors 80 may be provided in each of the plurality of first switching elements and in each of the plurality of second switching elements, included in the first inverter 10 and the second inverter 20, respectively. When the temperature sensed by the temperature sensor 80 is no less than a preset limit temperature, the controller 100 may diagnose that the first inverter 10 or the second inverter 20 has been overheated.

Figure 8:
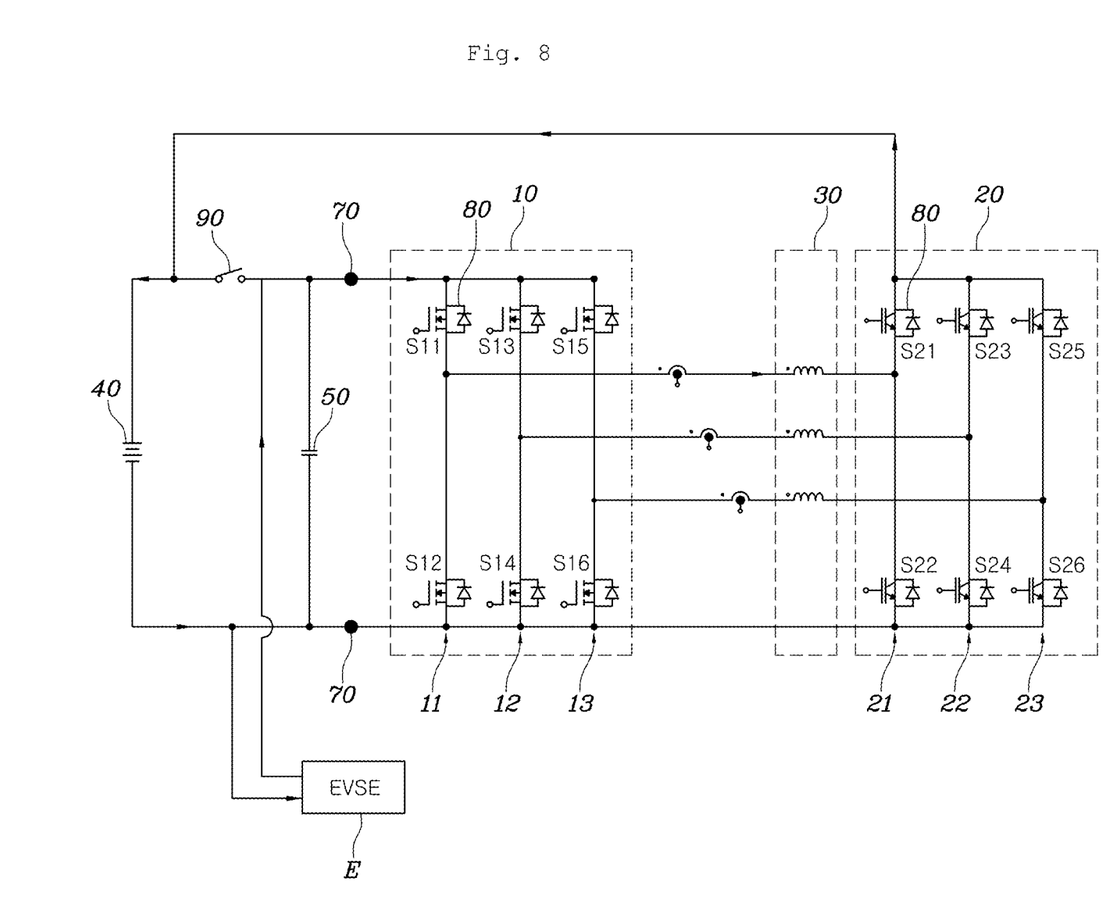
FIG. 8 is a circuit diagram showing a state in which a battery is charged with a voltage of charging power that is stepped down through a first inverter and a second inverter according to the embodiment of the present disclosure.
Figure 9:
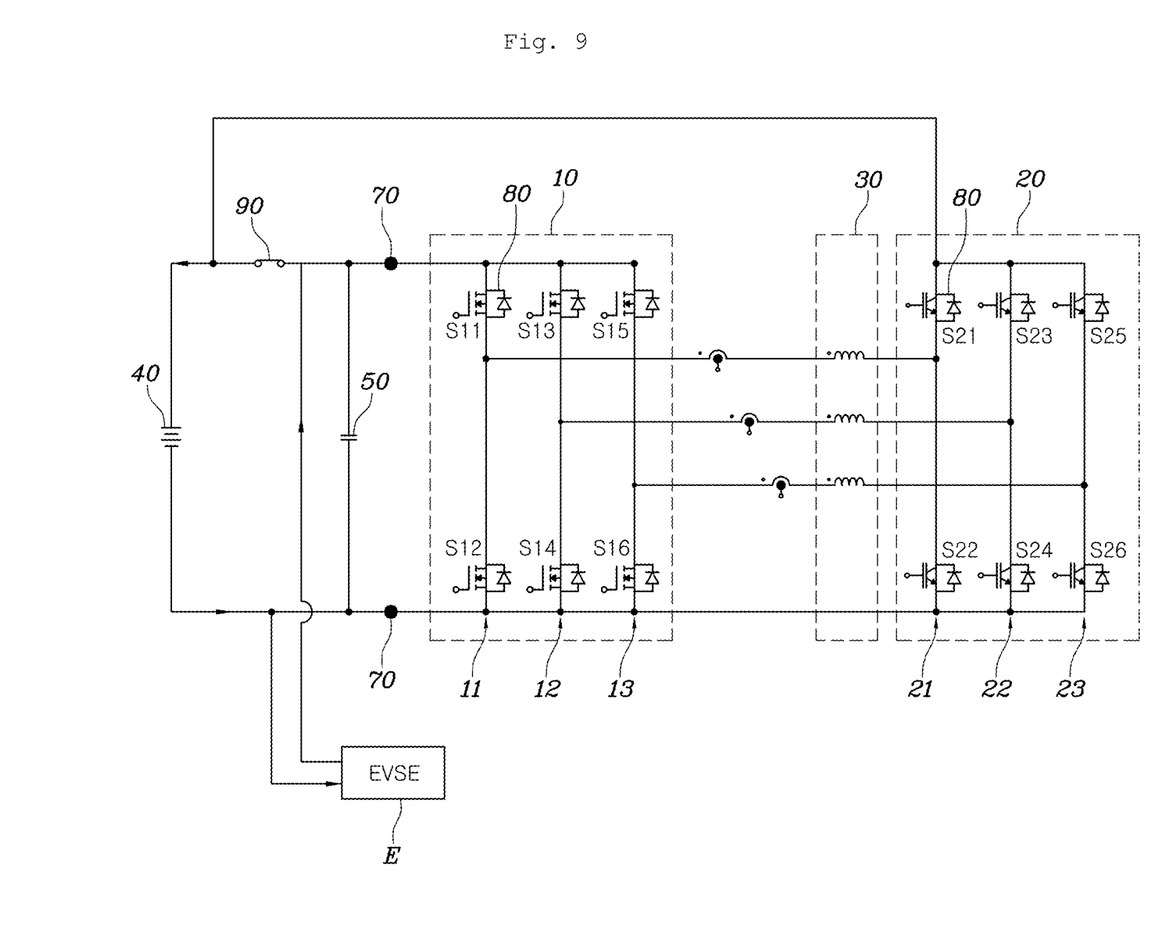
FIG. 9 is a circuit diagram showing a state in which the battery is directly charged via the power input terminal according to the embodiment of the present disclosure.

FIG. 8 circuit diagram showing a state in which a battery is charged with a voltage of charging power that is stepped down through a first inverter and a second inverter according to the embodiment of the present disclosure. FIG. 9 is a circuit diagram showing a state in which the battery is directly charged via the power input terminal according to the embodiment of the present disclosure.

As shown in FIG. 8, when the controller 100 cuts off the charging relay 90, the voltage of the charging power input to the power input terminal may be stepped down while sequentially passing the first inverter 10, the motor 30, and the second inverter 20. Thus, the battery 40 is thereby charged.

As an example, when the battery 40 is charged with the voltage of the charging power that is stepped down while sequentially passing through the first inverter 10, the motor 30, and the second inverter 20, the power Pin of the quick charger E is the product of the charging voltage and the charging current (Pin=Vin×Iin), the input power Pbat of the battery 40 is the product of the voltage of the battery 40 and the input current (Pbat=Vbat×Ibat). Here, the input power Pbat of the battery 40 may be a value obtained by multiplying the power of the quick charger E and the power conversion efficiency η of the motor 30, the first inverter 10, and the second inverter 20 (Pbat=Pin×η). Accordingly, when charging the battery 40 with the voltage of the charging power that is stepped down, the input current Ibat of the battery 40 may be calculated as follows.

$$Ibat=(Vin \times Iin \times \eta)/Vbat$$

As shown in FIG. 9, when the controller 100 short-circuits the charging relay 90, the battery 40 may be directly charged via the power input terminal. In this case, for the first inverter 10 and the second inverter 20, the control of the pulse width modulation or control of switching may be turned off.

For example, when the battery 40 is directly charged via the power input terminal, the input current Ibat' of the battery 40 is the same as the charging current Iin. Accordingly, the input power Pbat' of the battery 40 may be calculated as the product of the charging voltage of the battery 40 and charging current Iin (Pbat'=Vbat×Ibat'=Vbat×Iin).

Therefore, the ratio between Pbat and Pbat' or between Ibat and Ibat' is as follows. Pbat and Ibat are the input power and the input current, respectively, of the battery 40 in the case when the battery 40 is charged with the voltage of the charging power that is stepped down through the first inverter, the motor 30, and the second inverter 20. Pbat' and Ibat' are input power and the input current, respectively, of the battery 40 in the case when the battery 40 is directly charged via the power input terminal.

$$Pbat/Pbat'=Ibat/Ibat'=Vin \times \eta/Vbat$$

For example, assuming that the charging voltage Vin is 800 V, the voltage Vbat of the battery 40 is 400 V, and the power conversion efficiency η of the motor 30, first inverter 10, and the second inverter 20 is 90%, the ratio of the charging power of the battery 40 or the input current of the battery 40 is calculated as 180%. In other words, when charging the battery 40 with the voltage of the charging power that is stepped down with the motor 30, first inverter 10, and the second inverter 20, the charging power of and the input current of the battery 40 may be increased by 180% compared to those when directly charging the battery 40 via the power input terminal.

Figure 10:
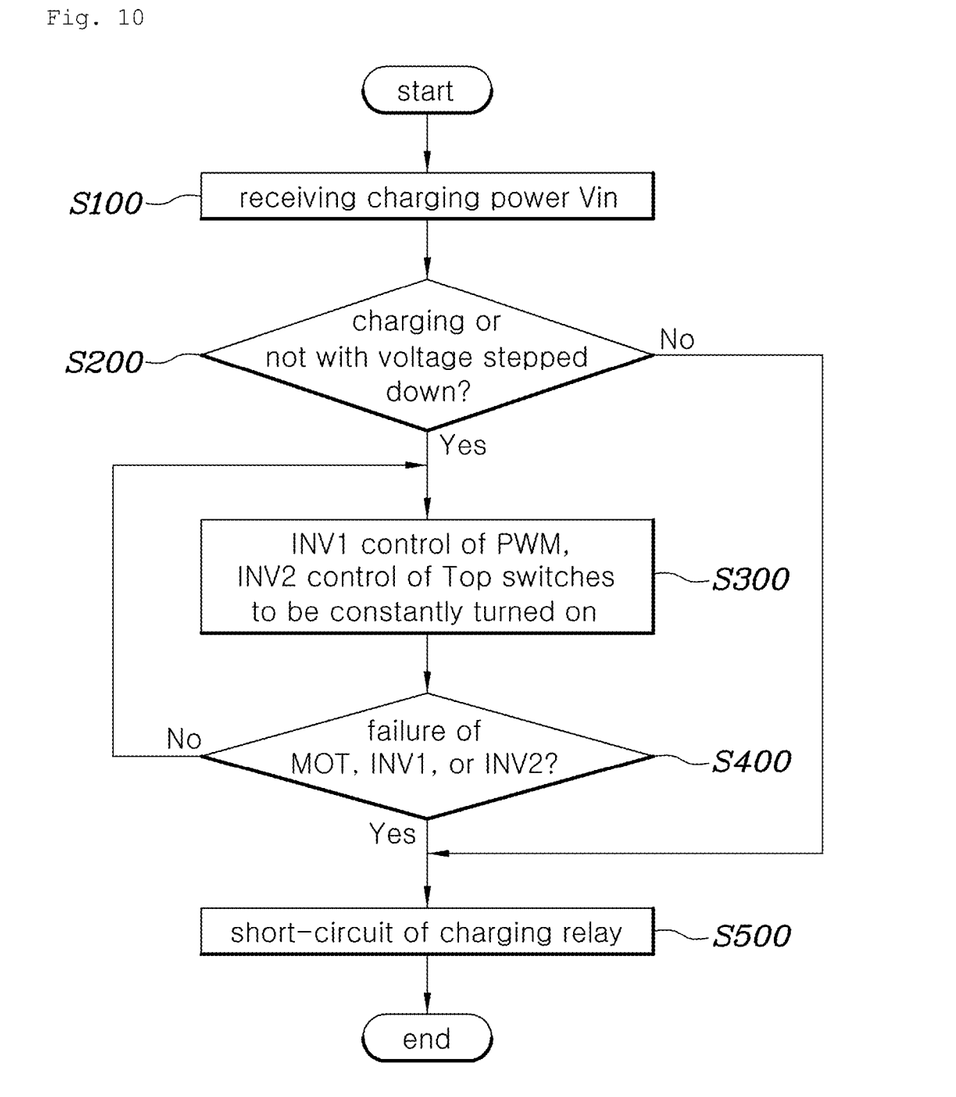
FIG. 10 is a flowchart of a multi-input charging method using the motor driving device according to the embodiment of the present disclosure.

FIG. 10 is a flowchart of a multi-input charging method using the motor 30 driving device according to the embodiment of the present disclosure.

With further reference to FIG. 10, a multi-input charging method according to an embodiment of the present disclosure is a charging method using a multi-input charging system using a motor 30 driving device. The method includes receiving a voltage level of charging power input to a power input terminal in step S100. The method further includes determining whether to charge a battery 40 directly or with a voltage of the charging power that is stepped down, depending on the received voltage level of the charging power in step S200. The method further includes directly charging the battery 40 via the power input terminal or charging the battery 40 with the voltage of the charging power that is stepped down through the first inverter 10 and the second inverter 20, on the basis of the determined result, in step S300.

In step S300 of charging the battery 40, a charging relay 90 provided between the power input terminal and the battery 40 is controlled whether to be or not to be short-circuited. Thus, the battery 40 may be charged via the power input terminal, directly or with the voltage of the charging power that is stepped down through the first inverter 10 and the second inverter 20.

In step S300 of charging the battery 40, pulse width modulation may be controlled so that a plurality of first switching elements included in the first inverter 10 is to be turned on/off according to a duty ratio. The top switching elements of the plurality of second switching elements included in the second inverter may be controlled to be always turned on.

The charging method may further include, after step S300 of the charging the battery 40, step S400 of diagnosing whether the motor 30, the first inverter 10, or the second inverter 20 has a failure. The charging method may also include step S500 of directly charging the battery 40 via the power input terminal when the failure is diagnosed.

In step S400 of the diagnosing whether the failure has occurred, phase currents flowing in the plurality of phases of the motor 30 are sensed by the current sensors provided in the plurality of windings of the motor 30. On the basis of the sensed phase currents and an input current of the battery 40, it may be diagnosed whether the motor 30, the first inverter 10, or the second inverter 20 has a failure, or a temperature is sensed by the temperature sensors provided in the plurality of first switching elements or the plurality of second switching elements. On the basis of the sensed temperature, it may be diagnosed whether the motor 30, the first inverter 10, or the second inverter 20 has a failure.

Although shown and described in relation to specific embodiments of the present disclosure, it should be apparent to a person of ordinary skill in the art that the present disclosure may be variously improved and changed within the limit without departing from the technical spirit of the present disclosure provided by the following claims.

What is claimed is:

1. A multi-input charging system using a motor driving device, the system comprising:
   a motor having a plurality of windings corresponding to a plurality of phases, respectively;
   a first inverter comprising a plurality of first switching elements and having one end connected to a power input terminal to which charging power is input from the outside and an opposite end connected to a first terminal of each of the plurality of windings;
   a second inverter comprising a plurality of second switching elements and having one end connected to a battery and an opposite end connected to a second terminal of each of the plurality of windings;
   the battery connected to the power input terminal or the one end of the second inverter; and
   a controller configured to directly charge the battery via the power input terminal or to charge the battery with a voltage of the charging power that is stepped down through the first inverter and the second inverter, depending on a voltage level of the charging power input to the power input terminal when a charging mode for charging the battery is initiated.

2. The system of claim 1, further comprising:
a charging relay provided between the power input terminal and the battery,
wherein the controller is configured to control the charging relay whether to be short-circuited, thereby charging the battery via the power input terminal, directly or with the voltage of the charging power that is stepped down through the first inverter and the second inverter.

3. The system of claim 1, wherein, when the charging mode is initiated, the controller is configured to charge the battery through the first inverter and the second inverter when the voltage level of the charging power is no less than a reference voltage preset to a chargeable level.

4. The system of claim 3, wherein the controller is configured to control pulse width modulation so that the plurality of first switching elements included in the first inverter is to be turned on/off according to a duty ratio.

5. The system of claim 4, wherein the controller is configured to set the duty ratio of top switching elements among the plurality of first switching elements as a ratio of a voltage of the battery to the voltage level of the charging power.

6. The system of claim 3, wherein the controller is configured to control top switching elements of the plurality of second switching elements included in the second inverter to be always turned on.

7. The system of claim 1, wherein the controller is configured to diagnose whether the motor, the first inverter, or the second inverter has a failure, and when the failure is diagnosed, the controller is configured to control to directly charge the battery via the power input terminal.

8. The system of claim 7, further comprising:
a current sensor configured to sense a phase current flowing in each of the plurality of phases of the motor by being provided in each of the plurality of windings of the motor,
wherein the controller is configured to diagnose whether the motor, the first inverter, or the second inverter has a failure on the basis of each phase current sensed by the current sensor and an input current of the battery.

9. The system of claim 7, further comprising:
a temperature sensor configured to sense a temperature by being provided in each of the plurality of first switching elements or in each of the plurality of second switching elements,
wherein the controller is configured to diagnose whether the motor, the first inverter, or the second inverter has a failure on the basis of the temperature sensed by each of the temperature sensors.

10. A multi-input charging method using a motor driving device, using the motor driving device of claim 1, the method comprising:
receiving a voltage level of charging power input to a power input terminal;
determining whether to charge a battery directly or with a voltage of the charging power that is stepped down, depending on the received voltage level of the charging power; and
directly charging the battery via the power input terminal or charging the battery with the voltage of the charging power that is stepped down through the first inverter and the second inverter, on the basis of the determined result.

11. The method of claim 10, wherein in the charging the battery, a charging relay provided between the power input terminal and the battery is controlled whether to be short-circuited, thereby charging the battery via the power input terminal, directly or with the voltage of the charging power that is stepped down through the first inverter and the second inverter.

12. The method of claim 10, wherein in the charging the battery, pulse width modulation is controlled so that the plurality of first switching elements included in the first inverter is to be turned on/off according to a duty ratio, and
top switching elements of the plurality of second switching elements included in the second inverter are controlled to be always turned on.

13. The method of claim 10, further comprising:
after the charging the battery, diagnosing whether the motor, the first inverter, or the second inverter has a failure; and
directly charging the battery via the power input terminal when the failure is diagnosed.

14. The method of claim 13, wherein in the diagnosing whether the failure has occurred, phase currents flowing in the plurality of phases of the motor are sensed by current sensors provided in the plurality of windings of the motor, and on the basis of the sensed phase currents and an input current of the battery, it is diagnosed whether the motor, the first inverter, or the second inverter has a failure, or
a temperature is sensed by temperature sensors provided in the plurality of first switching elements or the plurality of second switching elements, and on the basis of the sensed temperature, it is diagnosed whether the motor, the first inverter, or the second inverter has a failure.

* * * * *